United States Patent [19]
Roberge

[11] Patent Number: 4,961,569
[45] Date of Patent: Oct. 9, 1990

[54] ARM LEVERS FOR TOTAL EXERCISE STATIONARY CYCLES

[76] Inventor: Raymond F. Roberge, 169 Medway Rd., Apt. 4, Milford, Mass. 01757

[21] Appl. No.: 364,099

[22] Filed: Jun. 12, 1989

[51] Int. Cl.⁵ ............................................. A63B 21/00
[52] U.S. Cl. ..................................... 272/73; 74/551.3
[58] Field of Search ...................... 272/73, 72, 67, 68; 74/551.5, 551.6, 551.7, 551.4, 551.2, 551.1

[56] References Cited

U.S. PATENT DOCUMENTS

| | | | |
|---|---|---|---|
| 593,943 | 11/1897 | Kingsland | 272/73 |
| 604,371 | 5/1898 | Cook | 272/73 |
| 4,023,436 | 5/1977 | Dodge | 74/551.5 |
| 4,625,963 | 12/1986 | Lancellotti | 272/23 |
| 4,712,790 | 12/1987 | Szymski | 272/73 |

FOREIGN PATENT DOCUMENTS 0601729 8/1934 Fed. Rep. of Germany ..... 74/551.3

*Primary Examiner*—Stephen R. Crow
*Attorney, Agent, or Firm*—Irving M. Kriegsman

[57] ABSTRACT

An arm lever for use on exercise equipment. The arm lever includes a handle, a support member and a connecting mechanism for connecting the handle to the support member. The connecting mechanism enables the handle to be oriented at any one of a number of different angular positions relative to the support member and releasably locked in place at the desired angular position. The particular angular position chosen is dependent on the exercise being conducted.

5 Claims, 4 Drawing Sheets

ARM LEVERS FOR TOTAL EXERCISE STATIONARY CYCLES

BACKGROUND OF THE INVENTION

This invention relates generally to exercise equipment, and, more particularly to a total exercise stationary cycle which includes arm levers having angularly adjustable handles.

In recent years, more and more people have become health conscious. Studies have shown that there is a direct correlation between the physical and mental well-being of an individual and their exercise program. In fact, statistics show that exercise is becoming a necessity for enjoying a long and healthy life. It has been established that endurance-type overall exercise plays an important role in reducing stress, high blood and elevated cholesterol readings. In addition, an increase in an individual's muscular strength can even aid in the performance of everyday activities such as lifting groceries, moving furniture, gardening and enjoying recreational activities.

As a consequence of the increased desirablity of exercise there has been an unprecedented increase in the number of different types of exercise equipment on the market today. One of the most effective pieces of exercise equipment is the total exercise stationary cycle. The benefit of using such a piece of equipment is that it can be utilized in order to improve both overall cardiovascular conditioning as well as increase muscular strength. The total exercise stationary cycle, in a single piece of equipment, permits the user or operator to gradually develop numerous muscle groups while increasing overall endurance.

The total exercise stationary cycle differs from the stationary exercycle in that it incorporates therein a pair of movable as opposed to fixed arm levers. These arm levers are directly associated with a pedalling mechanism. The arm levers are usually in the form of tubular members which are bent at their upper end to form handles which may be grasped by the user. The handles are oriented horizontally. The bottom ends of the arm levers are attached to the wheel axle of the cycle. The arm levers can be utilized independently of pedalling the cycle in order to substantially increase the amount and type of exercise which can be performed.

A problem which is associated with the total exercise cycle is the inability of the arm levers to effectively allow the user to best utilize the wide variety of exercises capable of being undertaken with the cycle. This is due mainly because the handles at the ends of the arm levers of conventional total exercise stationary cycles are disposed in a horizontal position and that for certain exercises this angular position is either uncomfortable for the user or does not constitute the best position for maximum muscle build-up. In particular, when an exercise requires the arms to be positioned substantially against the body during the exercise, the horizontal orientation of the handles makes such a requirement extremely difficult and for some people not even possible. It therefore would be desirable to provide lever arms for exercise equipment which would enable the user to obtain not only the optimum exercise value for a variety of different exercises but also the ability to perform these exercises in a maximum of comfort.

SUMMARY OF THE INVENTION

The present invention is directed to a total exercise stationary cycle which includes arm levers having angularly adjustable handles. The arm levers of this invention overcome many of the problems set forth above associated with exercise equipment.

More specifically, this invention provides an arm lever which includes a handle and a rod and which incorporates therein a uniquely constructed mechanism for interconnecting the handle to the rod so as to enable the handle to be selectively rotated with respect to the rod. The interconnecting mechanisms permits the handle to move between a number of different angular positions ranging from the horizontal to the vertical and includes means for locking the handle at a desired angular position. This is especially useful since in certain exercises the horizontal position of the handle is most desirable, yet, with other exercises the vertical or an in-between position is preferred.

It is therefore an object of this invention to provide an arm lever having an angularly adjustable handle for use within exercise equipment.

It is another object of this invention to provide a lever arm having an adjustable handle for use within a total exercise stationary cycle.

It is still another object of this invention to provide a variety of interconnecting mechanisms which enable the handle in an arm lever in a piece of exercise equipment to be adjustably moved to a number of different angular positions with respect to a support member.

It is a further object of this invention to provide an arm lever which is economical to produce.

For a better understanding of the present invention together with other and further objects thereof, reference is made to the following description, taken in conjunction with the accompaning drawings and its scope will be pointed out in the appended claims.

DETAILED DESCRIPTION OF THE PREFERRED EMBODIMENT

The present invention is directed to an arm lever for a stationary exercise cycle having a handle which is angularly adjustable.

Figure 1:
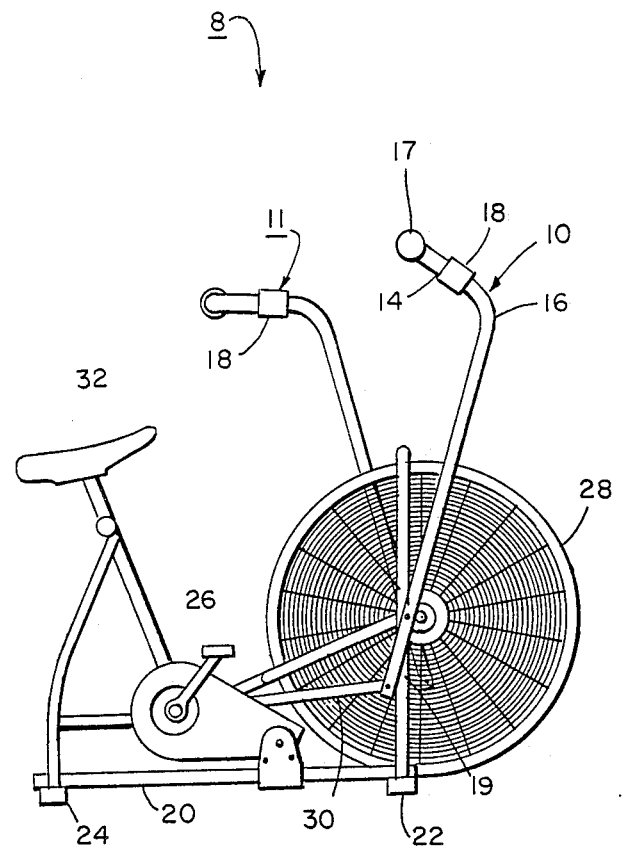
FIG. 1 is a pictorial representation of a total exercise stationary cycle incorporating therein a pair of arm levers according to this invention.
Figure 4:
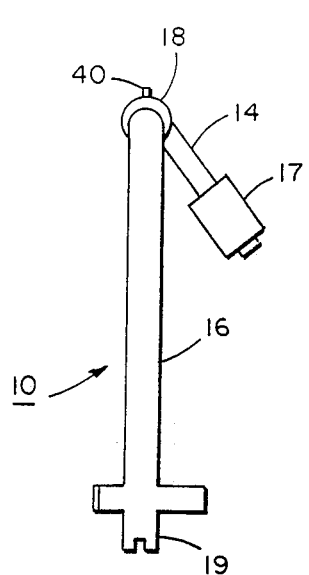
FIG. 4 is a front view of the arm lever shown in FIG. 2 with the handle angled downward.
Figure 2:
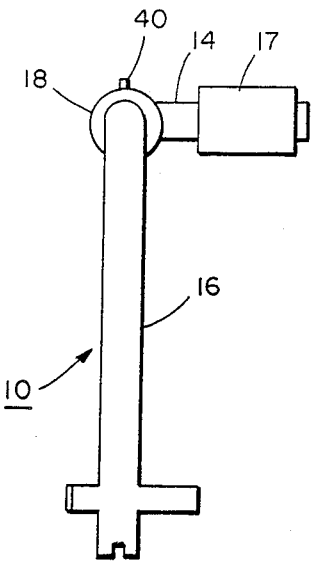
FIG. 2 is a front view of one of the arm levers shown in FIG. 1 with the handle horizontal.
Figure 3:
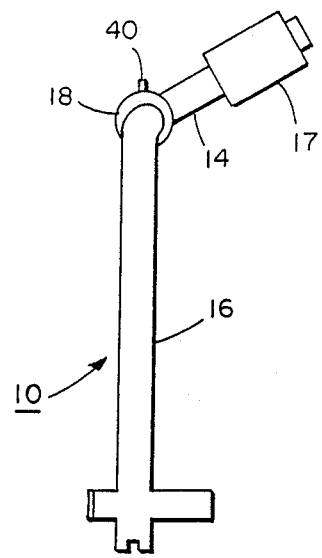
FIG. 3 is a front view of the lever arm shown in FIG. 2 with the handle angled upward.
Figure 5A:
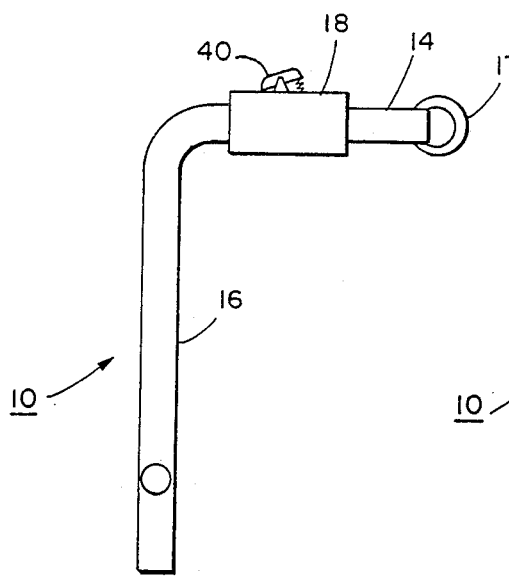
FIGS. 5(a) and 5(b) are side views of the arm lever shown in FIG. 1 with the handle angled horizontal and downward respectively.
Figure 5B:
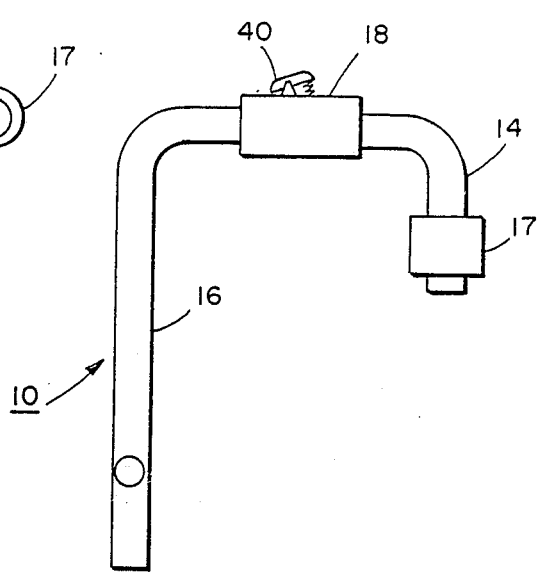
Figure 6:
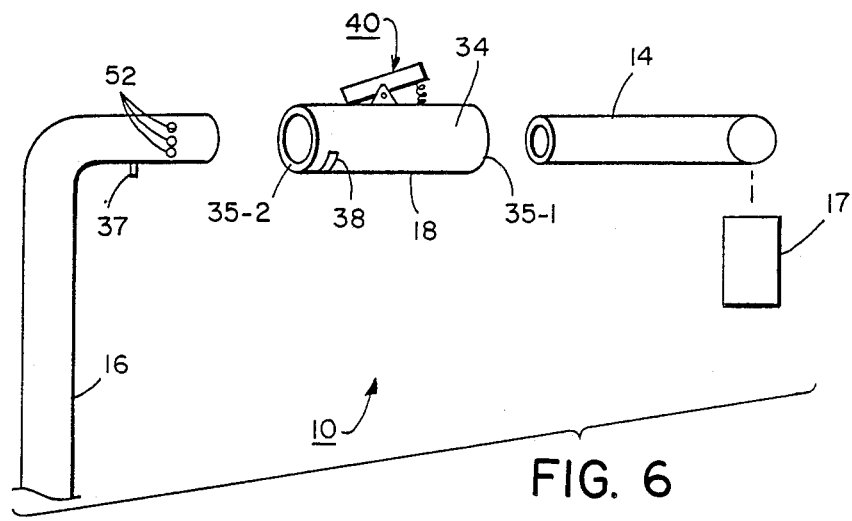
FIG. 6 is a fragmentary partly exploded partly broken away view of the arm lever shown in FIG. 1.
Figure 7:
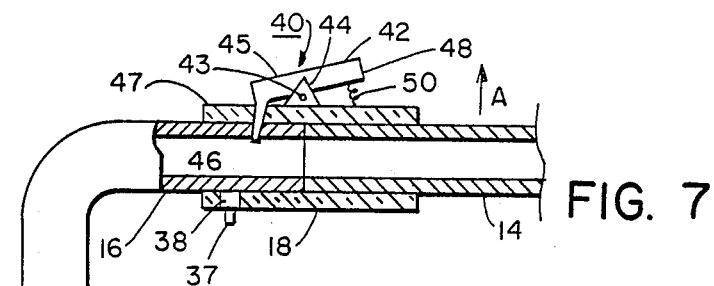
FIG. 7 is a segmented, cross-sectional view of the locking mechanism of the arm lever shown in FIG. 1.
Figure 8:
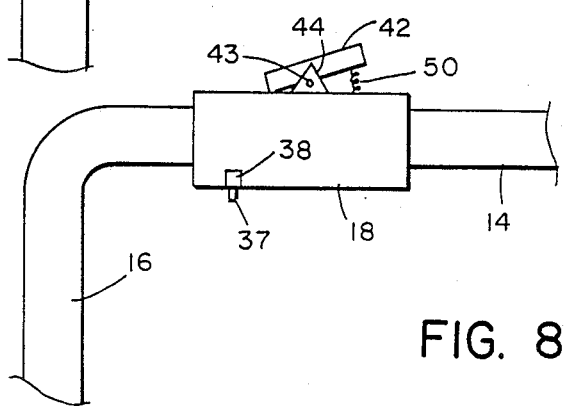
FIG. 8 is a segmented, side elevational view of the locking mechanism of the arm lever shown in FIG. 1.

Reference is now made to the drawings where FIG. 1 pictorially shows a total exercise stationary cycle 8 having a pair of arm levers 10 and 11 constructed according to this invention. Arm lever 11 is a mirror image of arm lever 10. Lever arm 10, the details of which are also shown in FIGS. 2–7 is made up of three major components; a handle 14, a rod or support member 16 and a connecting mechanism 18 for adjustably connecting handle 14 to support member 16. Handle 14 is an alongated tubular member. The support member 16 is also an elongated tubular member. The bottom end 19 of support member 16 is pivotally attached to the cycle. Handle 14 and support member 16 are made of metal or other suitable material. Handle 14 may include a grip 17 made of plastic, rubber or other suitable material. Views showing the handle portion of the arm lever in different angular positions are illustrated in FIGS. 2–5(b).

Still referring to FIG. 1 of the drawings, the remaining components of the total exercise stationary cycle 8 are conventional in design. More specifically, total exercise cycle 8 has a frame 20 supported upon front and rear stands or bases 22 and 24, a pedaling mechanism 26 and a fan-like wheel 28. A lever mechanism 30 interconnects each of the arm levers 10 and 11 near their lower ends with pedaling mechanism 26 such that pedaling of cycle 8 moves arm levers 10 and 11 back and forth. In addition, mechanism 30 permits arm levers 10 and 11 to move back and forth manually without pedalling in order to perform certain exercises. In both instances, the force required to move the pedaling mechanism 26 and/or arm levers 10 and 11 is controlled by the fan-like wheel 28.

In certain exercises the operator (not shown) sits upon seat 32 with is secured to frame 20 in order to pedal cycle 8 while in other exercises the operator positions himself or herself along side the cycle 10 in order to manually move arm lever 10 and 11. As pointed out in the Background of the Invention, the total exercise stationary cycle differs from a stationary exercyle by enabling the operator to perform a different series of exercises while either sitting on seat 32 or standing adjacent arm levers 10 and 11. The advantage of using the total exercise stationary cycle resides in the ability of the operator to exercise virtually all muscle groups with a single piece of exercise equipment.

The arm levers of the present invention enables the operator to obtain optimum exercise efficiency on a variety of different exercises with a maximum of comfort and is based on the concept that total effectiveness of a cycle can best be obtained if the angular position of the handles can be adjusted according to the particular exercise being conducted. The arm levers of this invention enable an operator to rotate the handles at the ends of the arm levers to any one of a number of settings between a vertical position and a horizontal position. Once the handle is rotated to its desired angular position a locking mechanism secures the handle in position relative to support 6 in a manner to be described in greater detail hereinbelow.

A preferred configuration of arm lever of the present invention is clearly depicted in the figures. As noted above, lever arm 10 includes handle 14, support member 16 and connecting mechanism 18, the connecting mechanism 18 serving to adjustably connect handle 14 to support member 16. Mechanism 18 includes a sleeve 34 made of metal and which is mounted on handle 14 and secured to handle 14 (preferably by welding) at one end 35-1 thereof. Support member 16 is rotationally and slidably mounted on the other end 35-2 of sleeve 34. A pin 37 welded to support member 16 and projecting out of a transverse slot 38 formed in sleeve 34 limits axial movement and also limits rotational movement of support member 16 relative to sleeve 34. Slot 38 is sized to allow 180 degree rotational movement of support 16 in sleeve 34. It should be recognized that sleeve 34, alternatively, could have end 35-2 fixedly secured within lever arm 16 and handle 14 rotatably mounted upon end 35-1. In either case, the object of the above described interconnection between handle 14 and support 16 is to mount handle 14 to lever arm 16 such that handle 14 can be rotated relative to support 16 and thereafter be locked in the desired position with respect thereto.

In order to lock handle 14 relative to support 16 at a particular angular position, a locking mechanism 40 is provided. Locking mechanism 40 includes a locking arm 42 pivotally mounted upon a pin 43 fixed to a bracket 44 which is welded to sleeve 34. One end 45 of locking arm 42 has a pin 46 which protrudes therefrom through a hole 47 in sleeve 34 while the other end 48 is biased in the direction of arrow A by spring 50. A series of radially spaced openings 52 in support member 16 are aligned to accept pin 46 in various rotational positions of support member 16. In order to rotate handle 14 relative to support 16, the operator merely has to press down on end 48 of locking arm 42, lifting pin 46 out of hole 47. Once handle 14 is in its desired position (vertical, horizontal or therebetween), the operator releases end 48 and spring 50 biases pin 46 into the particular opening 52 with which it is aligned.

Figure 9:
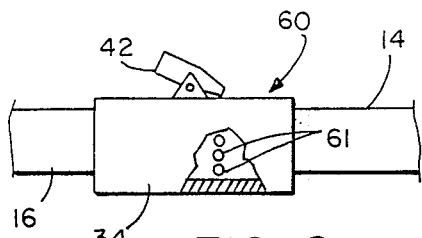
FIG. 9 is a segmented, side elevational view of an alternately configured locking mechanism for the arm lever of this invention.
Figure 10:
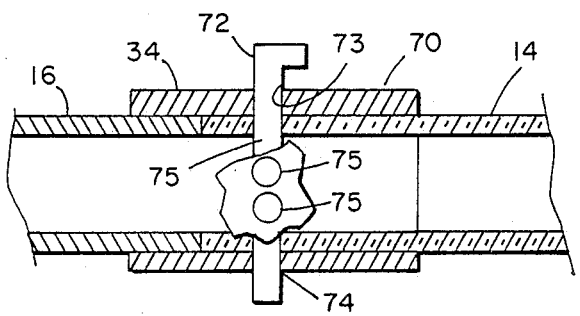
FIG. 10 is a segmented, side elevational view of another form of locking mechanism for the arm lever of this invention.
Figure 11:
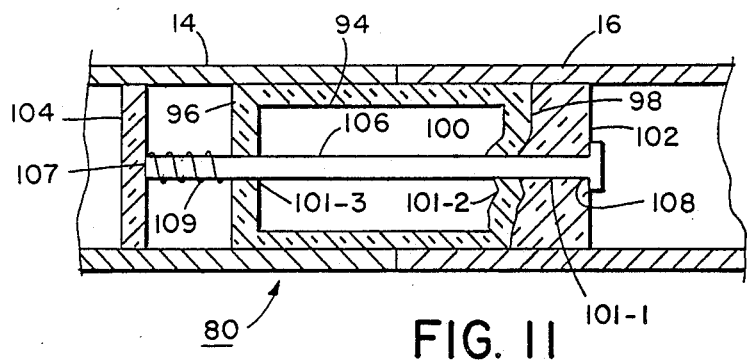
FIG. 11 is a segmented, cross-sectional view of still another variation of the locking mechanism utilized with the arm lever of this invention.

Alternative forms of the connecting mechanism are depicted in FIGS. 9, 10 and 11. In FIG. 9, for example, connecting mechanism 60 is similar to connecting mechanism 18 except that locking arm 42 is mounted to engage holes formed in in handle 14 rather than holes 50 in support 60 and sleeve 34 is fixed to support 16 and movable relative to handle 14. Once handle 14 is in its desired rotational alignment with respect to support 16, pin 46 can be released into the appropriate hole 61 in handle 14.

FIG. 10 illustrates a simplified connecting mechanism 70 which utilizes a removable pin 72 to interact with opening 73 and 74 in sleeve 34 which is fixed to support 16 and movable relative to handle 14 and a series of openings 75 in handle 14.

With respect to locking mechanism 80 illustrated in FIG. 11, a hollow cylinder 94 is fixedly secured such as by welding at end 96 inside handle 14. The other end 98 of cylinder 94 is slidably mounted inside support 16 has an irregular configuration 100 which is capable of matingly engaging with a similarly configured plate 102 secured within support 16. Another plate 104 is secured within handle 14. A rod 106, which protrudes through holes in plate 102 and 98, has one end 107 secured to plate 104, and the other end 108 secured to plate 102. A biasing means in the form of spring 109 is interposed between plate 104 and the end wall 102 of cylinder 94 in order to bias handle 14 into a locked position against support 16. In order to rotate handle 14 relative to arm lever 16, the operator operator pulls handle 14 in the direction of arrow B against the action of spring 109, axially rotates handles 14 into its desired position with respect to support 16 and releases handle 14 such that the configured end surface 100 and plate 102 interengage with each other.

With the adjustable arm lever 10 of the present invention, the full benefit of exercise can be obtained with a maximum of comfort and with a minimum of risk of injury.

Instead of a sleeve or a tubular insert the connecting mechanism could be in the form of a ball and socket type of joint.

Although the invention has be described with reference to particular embodiments, it should be understood that this invention is also capable of further and other embodiments within the spirit and scope of the appended claims.

What is claimed is:

1. An arm lever for a total exercise stationary cycle, said arm lever comprising:
    a. an elongated L-shaped tubular rod having a bottom end for connection to a pedalling mechanism on said total exercise stationary cycle, an intermediate portion for pivotal mounting on a frame on said total exercise stationary cycle and a top end;
    b. a handle having an end;
    c. one of said handle and said elongated L-shaped tubular rod having a plurality of holes; and
    d. means for pivotally connecting said end of said handle to the top end of said elongated L-shaped tubular rod such that said handle is axially aligned with said elongated L-shaped tubular rod and can be pivotally moved about the longitudinal axis of said elongated L-shaped tubular rod, said means comprising a tubular member fixed to one of said handle and said elongated L-shaped tubular rod and rotatably mounted on the other one of said handle and said elongated L-shaped tubular rod, and a locking mechanism for locking said handle at any one of a plurality of different positions, said locking mechanism comprising a type of hole engaging means.

2. An arm lever for a total exercise stationary cycle, said arm lever comprising:
    a. an elongated L-shaped tubular rod having a bottom end for connection to a pedalling mechanism on said total exercise stationary cycle, an intermediate location for pivotal mounting on a frame on said total exercise stationary cycle and a top end;
    b. a handle having an end; and
    c. means for pivotally connecting said end of said handle to the top end of said elongated L-shaped tubular rod such that said handle is axially aligned with said elongated tubular rod and can be pivotally moved about the longitudinal axis of said elongated L-shaped tubular rod, said means comprising a cylinder fixedly mounted inside one of said handle and said elongated L-shaped tubular rod and a plate fixedly mounted inside the other one of said handle and said elongated L-shaped tubular rod, the cyclinder having an irregular end surface and the plate having an irregular surface capable of mating with the irregular end surface on the cylinder, said means further comprising a locking mechanism in the form of a spring for urging said irregular surface of said cyclinder into engagement with said irregular surface of said plate.

3. A total exercise stationary cycle comprising:
    a. a base,
    b. a frame fixedly mounted on the base,
    c. a wheel,
    d. a pedalling mechanism secured to the frame and coupled to said wheel, and
    e. a pair of arm levers, each arm lever including:
        i. an elongated L shaped tubular rod having a bottom end for connection to a pedalling mechanism on said total exercise stationary cycle, an intermediate portion for pivotal mounting on a frame on said total exercise stationary cycle and a top end;
        ii. a handle having an end; and
        iii. one of said handle and said L-shaped tubular rod having a plurality of holes and;
        iv. means for pivotally connecting said end of said handle to the top end of said elongated L-shaped tubular rod such that said handle is axially aligned with said elongated L-shaped tubular rod and can be pivotally moved about the longitudinal axis of said elongated L-shaped tubular rod, said means comprising a tubular member fixed to one of said handle and said elongated L-shaped tubular rod and rotatably mounted on the other one of said handle and said elongated L-shaped tubular rod, and a locking mechanism for locking said handle at any one of a plurality of different positions, and said locking mechanism comprising a hole engaging means.

4. An arm lever for a total exercise stationary cycle, said arm lever comprising:
    a. an elongated L-shaped tubular rod having a bottom end for connection to a pedalling mechanism on said total exercise stationary cycle, an intermediate portion for pivotal mounting on a frame on said total exercise stationary cycle and a top end;
    b. a handle having an end; and
    c. means for pivotally connecting said end of said handle to the top end of said elongated L-shaped tubular rod such that said handle is axially aligned with said elongated L-shaped tubular rod and can be pivotally moved about the longitudinal axis of said elongated L-shaped tubular rod, said means comprising a tubular member fixed on said handle and rotatably mounted on said elongated L-shaped tubular rod, and a locking mechanism for locking said handle at any one of a plurality of different positions, said elongated L-shaped tubular rod having a plurality of holes, said locking mechanism comprising an arm pivotally mounted on said tubular member and having a protrusion at one end thereof and means for biasing said pivotally mounted arm so that said protrusion is in engagement with one of said openings in said elongated L-shaped tubular rod.

5. An arm lever as defined in claim 1 and wherein said openings are circumferentially spaced over a radial distance of about 180 degrees.

* * * * *